United States Patent [19]

Philipp

[11] Patent Number: 4,879,461
[45] Date of Patent: Nov. 7, 1989

[54] ENERGY FIELD SENSOR USING SUMMING MEANS

[76] Inventor: Harald Philipp, 15320 NE. 11th, K326, Bellevue, Wash. 98007

[21] Appl. No.: 185,843

[22] Filed: Apr. 25, 1988

[51] Int. Cl.$^4$ .............................................. G01N 9/04
[52] U.S. Cl. ............................ 250/221; 250/222.1; 340/555
[58] Field of Search .................. 250/205, 214 B, 221, 250/222.1; 340/555–557, 541; 358/105

[56] References Cited

U.S. PATENT DOCUMENTS

| | | | |
|---|---|---|---|
| 1,806,199 | 5/1931 | Hardy et al. | 356/321 |
| 2,227,147 | 12/1940 | Lindsay | 250/233 |
| 3,278,923 | 10/1966 | Archer | 340/555 |
| 3,278,924 | 10/1966 | Archer | 340/555 |
| 3,281,817 | 10/1966 | Archer | 340/555 |
| 3,428,815 | 2/1969 | Thompson | 250/353 |
| 3,597,755 | 8/1971 | Parkin | 340/555 |
| 3,644,917 | 2/1972 | Perlman | 340/556 |
| 3,858,043 | 12/1974 | Sick et al. | 250/221 |
| 3,859,043 | 1/1975 | Corbin | 8/125 |
| 3,867,628 | 2/1975 | Brown | 250/206 |
| 4,032,777 | 6/1977 | McCaleb | 250/214 B |
| 4,310,756 | 1/1982 | Sick et al. | 250/221 |
| 4,467,251 | 8/1984 | Jonsson | 318/480 |
| 4,581,526 | 4/1986 | Brattgard | 250/221 |
| 4,736,097 | 4/1988 | Philipp | 250/221 |

FOREIGN PATENT DOCUMENTS 2403052  7/1975  Fed. Rep. of Germany .

OTHER PUBLICATIONS

Philipp, Harald; "Optical Sensing Technique #1"; Document No. 183900, Dec. 21, 1987.
Bushong, D. B., "AGC-Controlled Light-Beam Detector Ignores Ambient Light Changes", Electronic Design, vol. 29, No. 19, pp. 188–190, (Sep. 17, 1981).
Pshaenich, A., "Constant-Current Feedback Loop Improves Photodetector Performance in Optical Sensors". Opcon, Inc., Instruction Manual, "8215A Low-Contrast Module", Document No. 102554-7904 from Opcon, Inc., 720 80th St., S. W. Everett, WA 98203-6299.

Primary Examiner—David C. Nelms
Assistant Examiner—Stephone B. Allen
Attorney, Agent, or Firm—Larry A. Jackson

[57] ABSTRACT

An energy field disturbance sensor comprises an energy field emission means such as a light emitting diode; the emitted field may contain a time-varying component. An energy sensing device such as a photodiode receives the field energy to produce a sensing signal related to the intensity of the emitted field and any disturbance therein. A second signal complementary to the sensed signal is added in a summing junction to the sensing signal to create a summation signal. If the emitted energy field contains a time-varying component, a detection circuit is used to sample the summation signal to convert the summation signal to a proportional detection signal. An analog to digital converter converts the detection signal to a digital form. Digital processing circuitry modulates the amplitude of the complementary signal or the intensity of the energy field according to the desired mode of operation, and in accordance with the behavior of the digital detection signal and external control signals. The circuitry is capable of creating a null condition in the detection signal when the received amplitude of the energy field is such that when added to the complementary signal a cancellation effect occurs; the null condition may be transient or continuous in nature depending on the mode of operation and the nature of the field disturbance.

20 Claims, 5 Drawing Sheets

ENERGY FIELD SENSOR USING SUMMING MEANS

TECHNICAL FIELD

This invention generally relates to sensing apparatus for the emission and subsequent detection of energy fields and disturbances within such fields, and more particularly to an optical sensor for sensing object motion, presence, or other disturbance within a sensing region.

BACKGROUND OF THE INVENTION

Active emission energy field sensors find widespread use in many industrial, commercial, and consumer markets. One type of such a sensor employs the use of light emitters such as light emitting diodes to illuminate a sensing area; the light energy from such emitters is detected and processed to determine the introduction of objects into the sense field, or the motion of objects already in the sense field. Another type of sensor emits an electrostatic field, and detects fluctuations in the emitted field due to capacitive effects induced by objects introduced or moved in the sense field. Similar detectors are commercially available for magnetic, microwave, and acoustic field sensing.

Each type of sensor mentioned above has applicability to different sensing situations. For example, an active field magnetic sensor is receptive only to ferrous or other magnetic or paramagnetic materials, and finds application in situations where it is desirable to detect such materials only and not non-magnetic materials.

In my previous patent, "Optical Motion Sensor", U.S. Pat. No. 4,736,097, these sensor types are reviewed in light of their characteristics and disadvantages. In this previous patent, a technique is described that can be used to enhance the sensitivity, dynamic range, and discrimination ability of emitted field optical sensors and other sensors as well, by means of the generation of a balance or cancellation energy field. This cancellation field may be modulated in such a way as to null the detected energy field, thus preventing amplifier saturation, eliminating detector nonlinearities, and reducing the effects of stray energy fields such as ambient light in a light based detector.

In certain sensing applications, ambient light or stray energy fields are not a problem. For example, in fiber optic sensing using a bifurcated fiber bundle, the introduction of ambient light into the detector is rarely significant because of the narrow acceptance angle of the fiber itself. Unless the fiber is aimed directly at a light source, very little ambient light will reach the photodetector. Hence, the need for a mechanism to decrease or eliminate detector nonlinearities is reduced, permitting the potential reduction in cost of such a sensor. Other types of energy field sensor means are known to be purely linear, and thus do not suffer from nonlinear gain effects when stray fields are present. For example, inductive air-wound coils responsive to magnetic fields possess essentially pure linearity, and thus do not require an energy field balance mechanism. However, it is still generally desirable to provide a mechanism by which sensitivity and dynamic range may be increased in such applications.

The use of a cancellation energy field also requires the additional expense of the second energy emitter, which may also require an objectional amount of additional physical space. The second emitter may also be difficult to align consistently, although this is not a frequent problem. Also, some sensors may involve the use of non-time-varying energy fields, as may be the case with a non-pulsed light energy field. In such situations, a cancelling energy field cannot be used because there exists no AC signal component which may be cancelled. With such a sensor a DC coupled amplifier must be used, and the cancellation signal would need to be negative to provide cancellation, a requirement which is clearly impossible with a non-polar energy field such as light.

In many applications where my previous patent has been employed it has become clear that there is a need for intelligent control of the modulated cancellation feedback signal. For example, it has been found useful in many situations to provide a modulation of the feedback that is nonlinear with respect to the net detected signal amplitude, rather than a simple integration function as described in my previous application. For example, nonlinear feedback modulation can be used to produce a slow cancellation effect when the net signal is less than a set threshold level, and fast cancellation adjustment when the threshold is exceeded. In this particular case, a motion detector is formed with an ability to ignore signals arising from drift in the output of light emitter due to temperature effects, or from slowly changing backgrounds. A number of modulation schemes may be incorporated into a sensor, allowing a user of such a sensor to select among several such schemes to optimize performance and to vary the operating mode according to the application.

It has also been found in sensors using my previous invention that the thresholding of the detected signal could benefit from a greater degree of flexibility. For example, in some situations it is desirable to select a threshold scheme whereby only increases or decreases or both increases and decreases in net received signal result in a triggered condition. If only net increases are used to create a triggered condition, the resulting sensor will respond only to objects in the sense field that cause an increase in signal strength. If only net decreases are used to create a triggered state, then only object motion or activity causing a decline in signal will trigger the sensor's output. It may be desirable to select both modes simultaneously, making the sensor responsive to either event.

Another desired feature would be a high degree of long term stability coupled with enhanced operational flexibility, normally unattainable by analog processing. These features are attainable by the use of digital acquisition, signal processing, and control techniques.

SUMMARY OF THE INVENTION

An object of the invention therefore is to provide a reduced cost active energy field sensor.

A further object of the invention is to provide a sensor with wide dynamic range that can automatically adjust to sense objects across a wide sensing region, but is simplified for use in environments or with energy field sensors where ambient energy fields do not substantially exist or cannot cause false triggering.

Another object of the invention is to provide for the cancellation and processing of non-time-varying, non-polar energy fields.

Another object of the invention is to increase the stability of the detection and processing circuitry in order to increase permissible sensitivity without false triggering.

Another object of the invention is to provide intelligent digital control of the sensor, to permit one or more modes of operation within the same sensor that are difficult or impossible to implement with analog circuitry.

Another object of the invention is to provide digital filtering capability in order to improve signal recovery and to provide flexibility in altering the filter characteristics to accommodate a wider range of applications.

To achieve these objects, an active energy field sensor according to the invention includes means for emitting a field of energy and means for sensing the emitted field to generate an electrical signal proportionate to the sensed energy field strength. It also includes means for adding a signal complimentary to the sensed energy field signal together with the sensed field signal to produce a summation signal. The sensed energy field signal in general has a constant or DC portion and a time varying or AC portion. Filter means are normally coupled to the sensing means to block the constant signal portion and pass the time varying signal portion; some energy sensors such as inductive coils do not respond with a DC portion and thus do not require a means to block such a signal. Non-time-varying energy fields do not have an AC signal portion, and the DC portion is required for further processing. The use of such fields requires that no DC blockage occur, and that further amplification and processing steps be responsive to a DC signal. It can be seen that one implementation of the invention is AC responsive, and another is DC responsive.

Detector means are used to convert the time varying portion of the sum of the two signals in an AC system to a proportional DC detection signal indicative of signal strength. Normally an amplifier is employed to increase the level of the signal between the sensing means and the detector means, usually after the summing point. In a DC system, such detector means would not be required; hereafter the term 'detection signal' may be applied equally to the DC signal level of a DC system.

The amplitude of the sensed energy signal can vary if an object enters the sensing region of space monitored by the sensor and changes the amount of energy reflected or otherwise directed toward the energy sensor. To adjust to a change in energy received at the energy sensor, modulating means responsive to the detection signal can modulate the amplitude of the complementary signal injected into the summing point to balance or null the received time varying signal. The modulating means incorporates digital logic or a microprocessor for highest stability; the modulation may be controlled by an algorithm either determined by logic hardware or by a software algorithm programmed in the microprocessor.

In the embodiment described, the energy emitting means comprises one or more pulsed infrared light emitting devices and the sensing means comprises a photodetector. However, devices that emit other forms such as microwave, electrostatic, magnetic, or acoustic could be used. The cancellation circuit in the described embodiment includes a pulse generator that creates an electrical signal capable of cancelling the AC signal portion of the photodetector output, the amplitude of the cancelling pulse modulated by a digital to analog converter (DAC) controlled by the digital logic or microprocessor. This is an AC system. In a DC system, the energy field would not be pulsed or otherwise time-varying, and the cancellation circuit would need to include only a DAC capable of creating the desired cancellation effect.

The general method of the invention includes generating a field of energy to be disturbed by objects within a selected region of space before being sensed, and also includes the generation of an electrical cancellation or nulling signal that complements the signal representative of the sensed field strength, the cancellation signal being directly coupled to the output of the sensing device or to the input or intermediate stage of an amplifier following the sensing device. The sum of the sensed signal and the cancellation signal result in a net non-zero signal if an unbalanced state exists, as would be the case if an object were to disturb the energy field or if the cancellation signal were intentionally set to create an unbalanced state.

The electrical cancellation signal may be modulated in response to the net detection signal to null the sum and produce a new constant sum, usually zero but in general a signal of known amplitude. Again, as previously described, this null in the sum may be a null in the AC signal component or a null in the DC level, depending on which type of energy field is employed. In achieving a null, the modulation thereby prevents further generation of the detection signal a time after motion or activity within the sensing region has ceased. The modulation method may also include various other algorithmic techniques responsive to the net signal amplitude, its polarity, and its duration to achieve different modes of sensor operation.

In some modes of operation, a null in the sum is not a normal state, the null being achieved only in a transient manner when an object in motion with respect to the apparatus momentarily reflects or interferes with the energy field to create a transient null condition. What is important in such cases is that the apparatus has the ability to achieve the null condition, and can discriminate between an object interfering with the sense field to a greater or lesser extent than indicated by the null point. Such behavior effectively makes the null point a comparison level, and the resulting apparatus becomes an energy field disturbance comparator.

For example, in an optical based proximity detection device, such a null point may indicate the presence of a known reflective object at a specific fixed distance X from the device. If the object is closer than this distance a null is not achieved as the sensed signal is greater than the cancellation signal, but the apparatus can determine that the object is closer than the null point X by examining the relative polarity of the detected net signal. Likewise, if the object is further than X distance a null is not achieved because the cancellation signal is greater than the sensed signal, but the apparatus can also ascertain that the object is farther than X by virtue of a relative detected net signal polarity opposite to that of the prior case.

BRIEF DESCRIPTION OF THE DRAWINGS

The figures presented relate to a version of a detector used for active infrared optical sensing. It is to be understood that other emitted energy fields are similarly possible with slight variation in circuitry through techniques commonly known to practitioners in the field.

DETAIL DESCRIPTION

Figure 1:
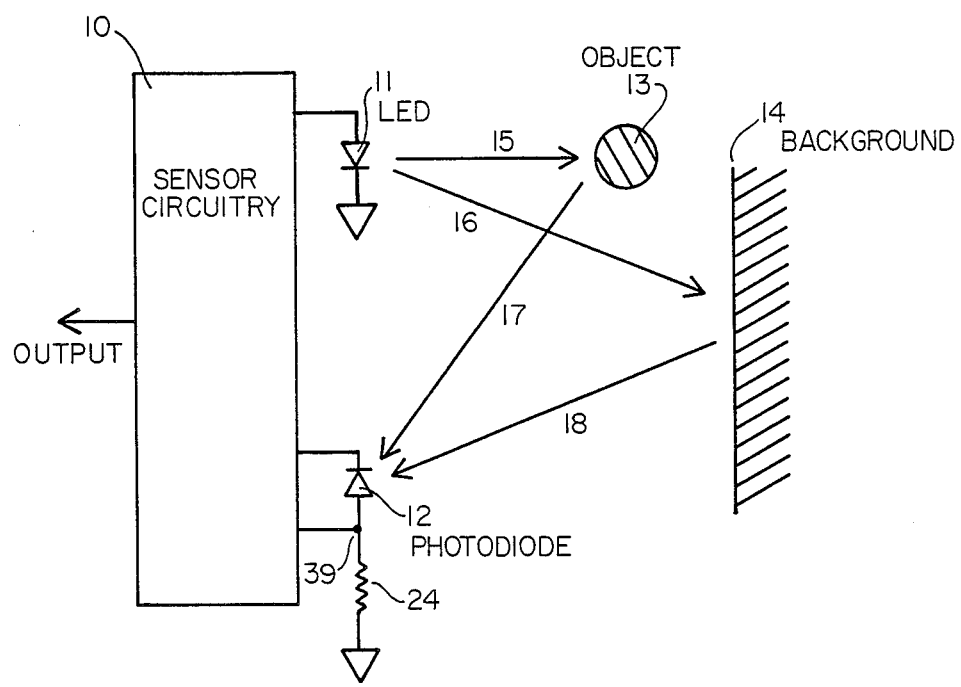
FIG. 1 is a block diagram showing an optical sensor according to the invention in an operative setting.

FIG. 1 shows an optical sensor according to the invention in an operative setting. The sensor includes an emitting means such as an infrared light emitting diode (LED) 11. LED 11 emits rays of a beam of energy represented by lines 15 and 16 into a sensing region of space. The beam reflects off objects in the region, such as a stationary background 14 which one desires to discriminate against, and an object 13 which one desires to sense. Light energy reflected from these objects is received by a PIN photodiode 12 sensitive to the emitted light energy. The diode 12 generates in response a signal current proportional to the intensity of the light received, which when passed through a passive element such as a resistor 24 will create a voltage according to Ohm's Law. This voltage is proportional to the total light energy received at a given moment in time from reflections from both background 14 and object 13. It is a desired object of the invention to be able to discriminate the signal from background 14 from object 13.

Figure 2:
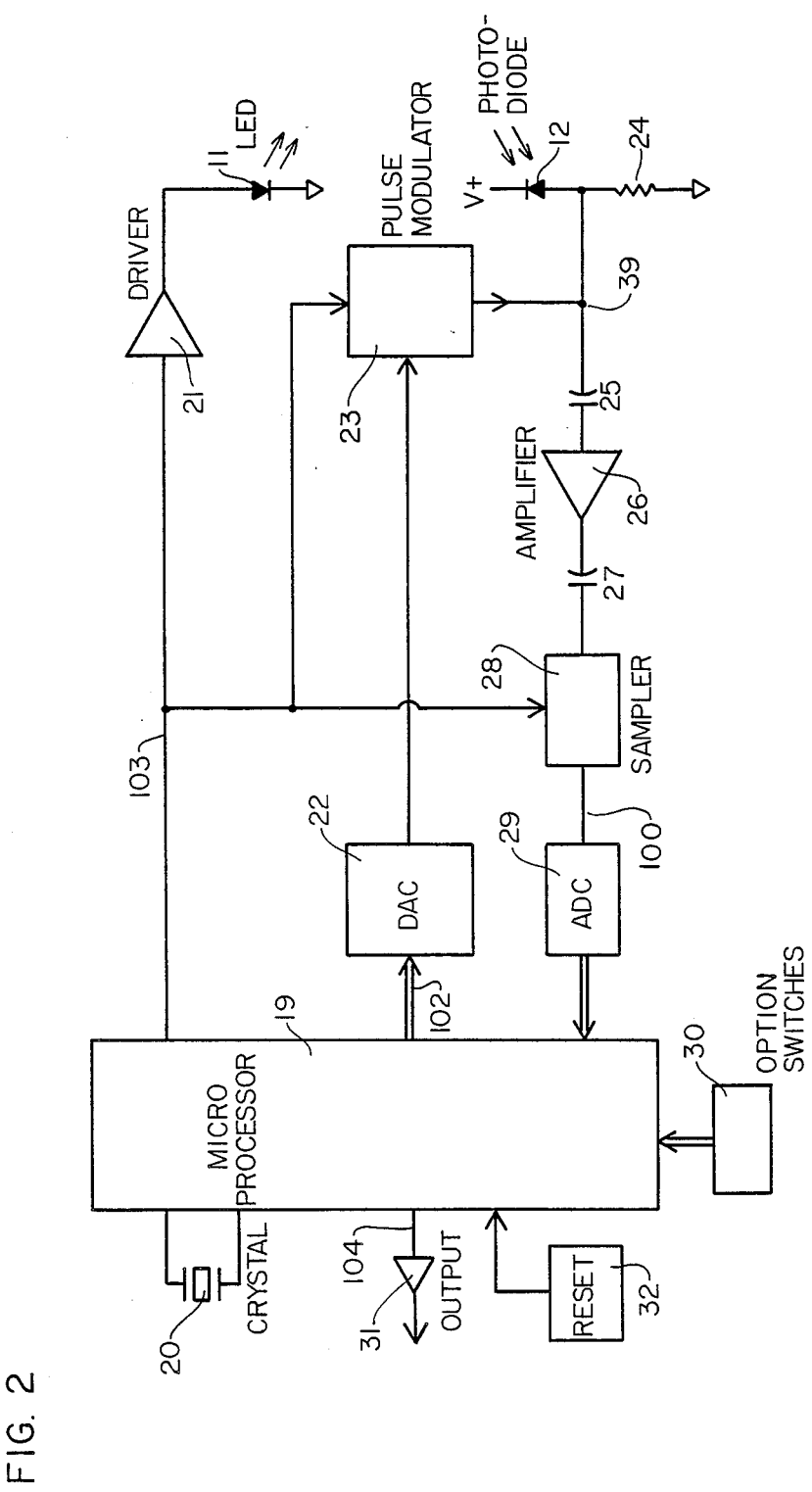
FIG. 2 is a block diagram of the optical sensor of FIG. 1.

FIG. 2 shows a block diagram of the sensing device operatively shown in FIG. 1. The emitted light beam is not present continuously but is pulsed on and off under the control of a line driven by the microprocessor 19. Complementary to the pulsed beam emitted by LED 11 is a second pulsed electrical signal current directly coupled to the output of the photodiode 12; this signal is generated by pulse modulator 23. Pulse modulator 23 creates complementary pulses in response to the same signal that turns LED 11 on; the amplitude of these pulses is controlled by a digital-to-analog converter (DAC) 22, which in turn is set by software incorporated into microprocessor 19. Although pulsing is utilized in this embodiment of the sensor, other well recognized techniques may also be used to generate complementary beams. For example, the emitted energy field and the injected complementary electrical signal could be represented by sinusoids that are 180° out of phase. The injected complementary signal is provided to permit the opportunity to cancel or null the signals generated from infrared energy received by photodiode 12 from the LED 11.

The signal at the output of photodiode 12 is added to the output of pulse modulator 23 on line 39. This signal is in turn capacitively coupled to amplifier 26 by capacitor 25. The capacitor blocks any DC component of the signal on line 39, so that the amplifier responds only to the pulse portion of the combined signals. At the output of the amplifier, a second capacitor 27 blocks any DC offsets introduced by the amplifier 26. The AC signal is then synchronously detected by sampler 28, which samples the signal only during the pulse interval when the LED 11 is turned on. This sampled signal is then converted to digital via analog-to-digital converter (ADC) 29, the output of which is input by microprocessor 19 for use by its internal software algorithms.

Options switches 30 permit the setting of different modes of operation; combinations of these switches may be used to activate or modify various software algorithms according to the desired result.

A reset circuit 32 insures proper operation of the microprocessor on power-up. A crystal 20 sets the operating frequency of the microprocessor, and output driver 31 provides for a trigger indication output suitable for driving external loads.

It is understood that although this specific implementation makes use of a microprocessor, random logic or other digital means may be employed to achieve the same result of a microprocessor.

The complementary signal amplitude setting of 23, and its rate and occurrence of amplitude change may be determined in microprocessor software according to algorithms designed to produce specific modes of sensor operation. These algorithms may take as their inputs the signal strength, threshold settings, signal polarity, and duration of the occurrence of a signal that exceeds a certain level. In general, the modulation always acts to produce a null condition by cancelling or attempting to cancel the signal received by the photodiode 12. The nature of these algorithms will be explained in detail later herein.

In general, the software should have the capability to create a null condition by setting DAC 22 such that signals received by photodiode 12 are cancelled. This process is described in FIG. 3A through 3E.

Figure 3:
FIG. 3A through 3E are timing diagrams illustrating the operation of the optical sensor of FIG. 2.

Assume that object 13 has not entered the field of view of the sensor, leaving only background 14 to reflect light back to the photodiode 12. This would be indicated by the voltage at line 39 as shown in FIG. 3A; Vr represents the voltage at 39 in the absence of object 13 and in the absence of any signal from pulse modulator 23. This signal would be amplified by 26, sampled by 28, converted with ADC 29, and sensed by software in microprocessor 19. Software may then act to set DAC 22 such that pulse modulator 23 outputs a pulse of equal by opposite polarity to the signal of 3A; such a signal on line 39 would be represented in FIG. 3B. When these two signals are superimposed on each other, an addition process, the signal of FIG. 3C results; this is a null condition. Once such a null condition has been achieved, software may, if so desired, refrain from further disturbing the setting of DAC 22 and hence the amplitude shown in FIG. 3B.

If such is the case, then the introduction of object 13 into view would cause the photodiode to generate the signal shown in FIG. 3D, where $Vr'-Vr$ is the signal increment caused by object 13's reflection. This new signal remains only partially nulled to the extent of the signal shown in FIG. 3B; the result is the net signal shown in FIG. 3E. This net pulse component is easily amplified, detected, and processed by the microprocessor; if software so chooses, it may elect to set the output driver 31 to a triggered state in response to this net signal, provided it is large enough (i.e. exceeds a threshold level), lasts a certain duration, etc. as may be required for an application. If software does not readjust the level of DAC 22 to cause new null state as in FIG. 3C, then the signal shown in FIG. 3E will last as long as the object 13 remains in view of the sensor, varying in amplitude depending on its proximity to the sensor, changes in its reflective characteristics, changes in its contrast compared to the background as it moves, etc.

The sensor 10 as shown in FIG. 1 is set in a proximity configuration, with the IR beam from LED 11 reflecting off objects within the sensing region. The system, however, can be set in other configurations without departing from the principles of the invention. In a retroreflective configuration, a retroreflector is spaced apart from the LED 11 across a boundary. The angle of the LED beam is made narrow, and is directed toward the retroreflector. The retroreflector increases the intensity of the energy reflected to photodiode 12, considerably extending sensing range. The range may be extended yet further in a beam break configuration, whereby the beam from LED 11 is aimed directly at photodiode 12 from a distance. The beam then does not have to travel back the distance to its origin, extending range even further.

SCHEMATIC DIAGRAMS AND OPERATION

Figure 4:
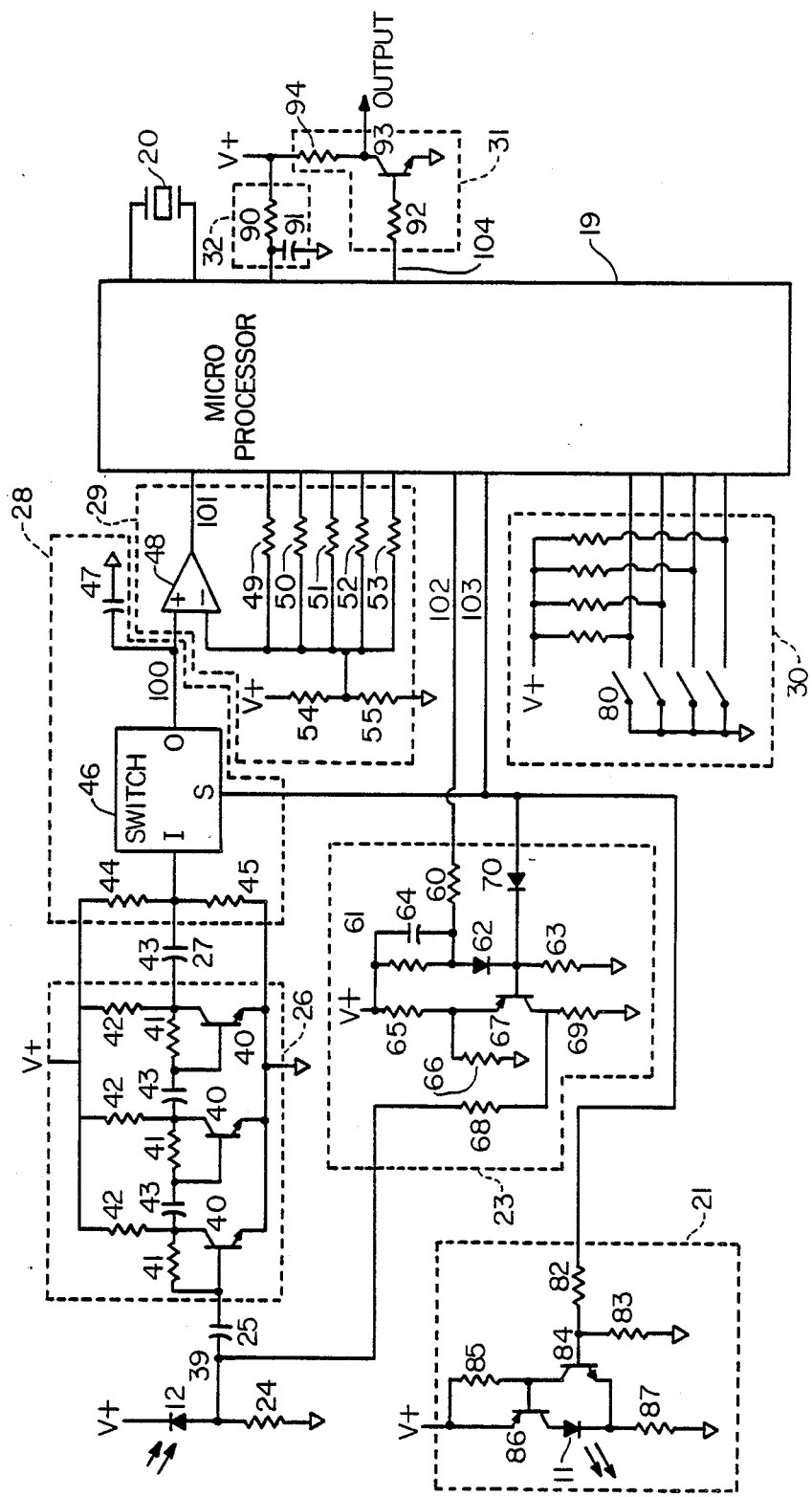
FIG. 4 is a schematic diagram showing one embodiment of the optical sensor of FIG. 2.

FIG. 4 is a schematic diagram of the sensor shown in FIG. 2. It should be understood that this schematic is merely an enabling illustration of a circuit that can be used to accomplish the functions of the block elements of FIG. 2 and is not meant as a limitation on the scope of the invention.

In this diagram microprocessor 19 is a Motorola 146805F2 single chip device with onboard read-only memory (ROM) for program storage and onboard random access memory (RAM) for temporary data storage. It also has an onboard 8-bit timer.

Amplifier 26 is a three-stage AC coupled amplifier having a voltage gain in excess of 90 db at the frequencies of interest. It is designed to pass the frequencies associated with the light pulse generated by LED 11 and sensed by photodiode 12, but to sharply attenuate other frequencies. The pulse width is typically 12 microseconds with an rate of about 1.5 khz. Line 103 controlling LED pulse driver 21, sampler 28, and pulse modulator 23 is pulsed by this 12 microsecond signal, which is generated under software control. The period of this pulse, i.e. its rate, is controlled by properly setting the microprocessor's internal timer to generate an interrupt at the proper time interval.

Capacitors 25 and 27 block any DC signals emanating from photodiode 12 or the last stage of amplifier 26 itself; capacitors 43 act to further attenuate low frequency signals caused by interference or noise. Three stages of amplification are generated with transistors configured as shown by 40, 41, and 42. The resulting amplified signal is fed to sampler block 28, composed of reference setting resistors 44 and 45, analog switch 46, and hold capacitor 47. Switch 46 closes between the terminals marked 'I' and 'O' when line 103 pulses high. The sampled signal 100 is converted to digital by ADC block 29, which includes comparator 48 and a digital-to-analog converter (DAC) formed by resistors 49 through 55 weighted in binary fashion.

The DAC shown has a resolution of 5 bits, and is driven directly from microprocessor 19 using five port pins configured to be open drain. When all five port lines driving 49 through 53 are open circuit, the voltage feeding comparator 48 is determined by resistors 54 and 55. Resistors 44 and 45 are set such that with no detectable signal, the sampled voltage on line 100 is equal to approximately the midpoint of the voltage range of the DAC feeding 48. Thus, both positive and negative going pulses at the output of 26 may be sensed. An algorithm used to convert signal 100 to digital may by example employ either a successive-approximation technique or a tracking converter technique, as are commonly known to practitioners in the art. In relation to FIG. 2, the digital output of ADC 29 is, in FIG. 4, derived internally within processor 19. If a successive approximation algorithm method is chosen, then at the moment of conversion completion the digital equivalent of signal 100 is to be found in the logic state of the processor lines driving resistors 49 through 53.

Pulse modulator 23 includes a PNP transistor 67 to generate a short, amplitude modulatable negative pulse time coincident with the emitted pulse of light. The control for this pulse is accomplished via line 103. The amplitude of this pulse is software controlled, via line 102. Line 102 carries a pulse-width modulated signal, the duty cycle of which is software controlled with the assistance of the microprocessor's internal timer; line 102 is configured to be open-drain. It is filtered through the action of resistors 60, 61, and 63, plus capacitor 64; diode 62 provides thermal compensation for the characteristics of transistor 67. It can be seen that as the duty cycle of 102 decreases, i.e. averages more duration of logical 0, the voltage level at the base of transistor 67 will drop. This will cause an increase in 67's collector current, thus increasing the level of voltage across resistor 69. When line 103 is set high during the pulse period, 67 cuts off due to the action of the pulse on 103 through diode 70, leaving zero current to flow through resistor 69. The purpose of resistors 65 and 66 are to create a Thevenin equivalent fixed voltage low enough to permit this cut-off action of 67, yet provide a resistance to permit the delivery of a controllable amount of current through 67 during the non-pulse interval. It can thus be seen that this circuit produces a short pulse whose amplitude is controllable by a digital algorithm, the pulse being of equal duration but complementary to the pulse sensed from LED 11 through photodiode 12. This pulse is in turn fed to line 39 through a relatively high-valued resistor 68; this resistor acts to produce a current through 24 which adds to the signals produced by photodiode 12.

DAC 22 as shown in FIG. 2 is not explicitly outlined in FIG. 4, as it is an integral portion of pulse modulator 23 in this implementation. Generally, however, the parts 60 through 64 perform the digital to analog conversion process, while also performing thermal compensation and biasing functions for transistor 67. The conversion of a pulse-width modulated signal to analog is one specific form of a DAC; in general any other type of DAC could be used as well.

LED driver 21 is a simple two-transistor circuit that provides for a regulated LED current pulse when line 103 goes high during the pulse interval. Resistor 87 samples the current through LED 11; transistor 84 acts as a gain stage, cutting off base drive current to 86 when current rises too high, and supplying more base drive when current is too low. PNP transistor 86 supplies the actual current to LED 11. Typical pulse currents range to 2 amps peak. Numerous other pulse driver schemes may be employed, including the use of a separate photodetector used as a feedback element to regulate actual light output rather than simply LED current in order to provide for long term light amplitude stability.

Figure 5:
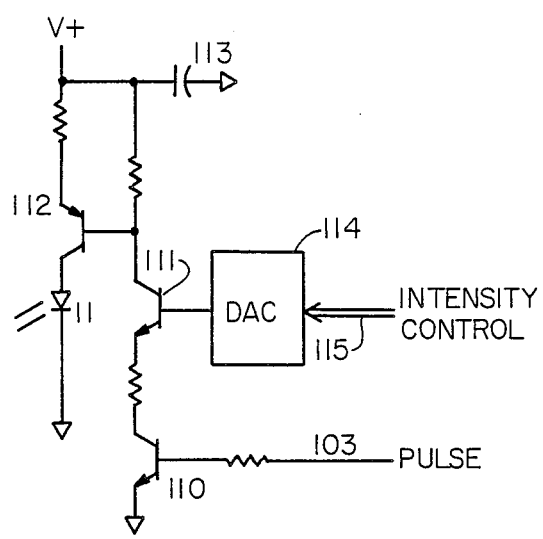
FIG. 5 is a schematic showing one method for controlling the amplitude of emitted light pulses in one version of the sensor.

FIG. 5 shows another version of an LED pulse driver, in which the amplitude of the emitted pulse of light is controlled digitally by DAC 114. Line 103 causes transistor 110 to turn on during the high portion of the pulse; the collector current through transistor 111 is restricted to this pulse portion, and the magnitude of the collector current is determined by the setting of DAC 114. During the pulse portion, a voltage is thus developed across the base of transistor 112 which acts to turn it on to a degree limited by the various resistors of the circuit and the setting of the DAC. Capacitor 113 acts to supply the required peak pulse currents if the voltage source V+ has a high series impedance.

The circuit of FIG. 5 may be used when it is desired to modulate the intensity of the emitted beam, rather than or in addition to the modulation of the cancellation pulse injected by 23. This might be the case if greater dynamic range of object detection is required.

Microprocessor 19 also accepts inputs from external signals set by switches 80. These control signals can cause the activation or deactivation of different algorithms as will be explained further.

The microprocessor provides an output 104 used to indicate a triggered condition. Other outputs may also be provided, for example to indicate direction of motion, signal intensity, etc.

In use, the dynamic range of permissible sensing is determined not by ADC 29 but rather by DAC 22. ADC 29 only serves to indicate differential signal strength, not absolute signal level. DAC 22 provides the cancellation signal which is directly indicative of absolute signal strength. It follows, therefore, that it is desirable to make DAC 22 with as many digital bits of resolution as possible. When generating the pulse-width modulated waveform on line 102 with an 8-bit timer, 8 bits of resolution or a dynamic signal range of 256:1 is achieved. Dithering of the timer through an algorithm, by alternately making the duty cycle of 102 first one discreet value and then an adjacent value, one can increase the resolution to 9 bits, for a dynamic signal range of 512:1. The filtering network centered around capacitor 64 acts to average this dithered duty cycle. By similar techniques it is possible to increase the dynamic range to 11 bits or more. Another method is to simply use a commercially available DAC with the desired resolution, although this typically involves more cost.

It can be appreciated that an alternate method for achieving cancellation may involve the use of a fixed cancellation signal, together with circuitry such as shown in FIG. 5 to permit the control of the amplitude of the emitted energy beam. It is also possible to achieve higher operational flexibility and greater dynamic range by permitting the amplitude control of both the emitted energy beam and the cancellation signal. All prior and subsequent discussions centering around the control of the cancellation signal may be equally applied to the control of the amplitude of the emitted energy field in addition to or in substitution for control of the cancellation pulse amplitude.

The following is a list of key components which may be used to implement the sensor as shown in the embodiment of FIG. 4.

| Photodiode 12 | SFH205 | Siemens |
| --- | --- | --- |
| LED 11 | OP295 | TRW |
| Amplifier transistors 40 | 2N5089 | Motorola |
| NPN transistors 84, 93 | 2N4401 | Motorola |
| Driver transistor 86 | 2N6727 | GE |
| Modulation transistor 67 | 2N5087 | Motorola |
| Diodes 62, 70 | 1N4148 | GE |
| Analog switch 46 | DG305A | Siliconix |
| Comparator 48 | LM311 | National |
| Microprocessor 19 | MC146805F2 | Motorola |

ALGORITHMS

The microprocessor 19 contains software that performs various algorithmic operations on the data recovered from signal 100 and on the setting of DAC 22.

Algorithms that operate on the signal 100 typically include ADC 29 operation, signal averaging, polarity detection and thresholding, and threshold limit timing. Signal averaging may be used to increase the signal to noise ratio, thus increasing sensitivity. Polarity detection may be employed to determine whether an object is approaching or receding; thresholding may involve multiple thresholds, including trigger condition thresholds and hysteresis thresholds. The result of these algorithms may be used in further processing to determine the operating mode.

For example, if signal 102 is made to always immediately attempt to cancel the detected signal once a threshold level is exceeded, no matter what the polarity of the signal, a motion detector results. At the moment the signal crosses either an upper or lower threshold the output of the sensor may be triggered.

If a threshold is not exceeded, the cancellation pulse modulation can be set to a very slow rate in order to cancel slowly occurring changes in the intensity of signals due to slow changes in the background signal, as might occur if background object 14 accumulates dirt which would change its reflectance over a period of time. The slow rate of modulation would not interfere with the detection of more rapid signal changes associated with new objects such as 13 introduced into the sense field.

In another example, a presence detector may be formed by an algorithm that refuses to modulate the cancellation signal in response to the detected signal. As long as the new object 13 remains in the sense field, the threshold will remain exceeded and a trigger output will occur. When the object leaves the sense field the net signal will fall below the threshold level or preferably a lower hysteresis threshold, and the triggered state will cease. This algorithm may be combined with the algorithm described in the previous paragraph to permit the cancellation of slow background changes, yet be responsive to the presence of more rapid object introductions.

In yet another example, the cancellation of received signals may be triggered by an algorithm responsive only to an external logic command. For example, the sensor can be made to cancel the object 13 upon external command, at which time the output 104 will cease. If the sensor is also made responsive only to positive signals, then after the external command the detector will cause an output only when the object comes closer than the position it had when the cancellation event took place. This becomes a type of 'learn mode', useful in many situations where it is desirable to detect only objects that come closer than a predetermined point, i.e. the point where the object was located with respect to the detector when the external command was received.

Another algorithm may produce a cancellation 'event' only after a threshold has been exceeded for a specific duration of time. This may be useful in many situations where normal presence sensing mode is desired, but where a triggered state longer than a specific duration may be considered to be a process malfunction or other condition requiring a new cancellation. For example, a new background object similar to 14 may be introduced into the sense field causing an unintentional but permanently triggered output state. With this algorithm, after a set duration known to be longer than the normal interval of object detection the algorithm may automatically cancel the new object from view.

In summary, the following are examples of algorithms used by a microprocessor or similarly controlled by digital logic to acquire the signals sensed by an energy field sensing element, to process the acquired signals, to control the balance signal, and generate the various required output signals:

1. Generation of timing signals, including generation of any required pulse signals 103 and pulse-width modulated signal 102.
2. Signal averaging of the acquired signal at 100 to filter the signal to improve the signal to noise ratio and thus increase sensitivity;
3. Thresholding of the filtered signal to determine whether a valid trigger state exists, including the use of hysteresis to reduce noise in the thresholding process. Thresholding occurs when the signal rises above or falls below a specific set level. The polarity of the signal may also be used to determine whether a desired triggered state exists or to determine the relative direction of motion of a detected object.
4. Adjustment of cancellation signal amplitude in accordance with the signal recovered from line 100, and in accordance with the value of the recovered signal with respect to the thresholds, the duration of the signal's exceeding of a threshold, its polarity, and external control signals;
5. Setting of output lines to indicate the occurrence of a triggered condition, to indicate signal strength, and to indicate signal polarity. A triggered condition may be dependent on signal polarity, strength, duration, and external control signals.

It can be seen that the digital acquisition, signal processing, and control techniques of this invention, while applied to the use of a directly injected and summed cancellation signal, may equally be applied towards the use of a balance or cancellation energy field as described in my prior U.S. Pat. No. 4,736,097. In this regard, the sensing element such as a photodiode becomes the summing junction referred to herein, with the cancellation signal being the cancellation energy field directed towards the sensing element. This cancellation energy field may be controlled in ways identical or similar to the control of the electrical cancellation signal described herein.

I claim:

1. An apparatus for sensing a disturbance within a sensing region, comprising:
   an emitting means for emitting a field of energy, said field of energy being disturbed by a change in said sensing region;
   sensing means for receiving energy from the emitted field of energy to produce a corresponding sensing signal;
   signal generation means for producing an electrical signal complementary in nature to the sensing signal that includes a digital to analog converter means for digital control of the amplitude of the electrical signal complementary to the sensing signal;
   summing means for adding the sensing signal and the electrical signal complementary to the sensing signal to create a summation signal whose amplitude is less than the sensing signal or opposite in polarity to the sensing signal; and
   detection means responsive to the summation signal to create a detection signal indicative of an energy field disturbance, such means including a conversion means to translate the detection signal to a digital signal proportionate to the level of the detection signal.

2. An apparatus for sensing a disturbance within a sensing region, comprising:
   an emitting means for emitting a time-varying field of energy, said field of energy being disturbed when a change in condition occurs in said sensing region;
   sensing means for receiving energy from the emitted field of energy to produce a corresponding time-varying sensing signal;
   signal generation means for producing an electrical time-varying signal complementary in nature to the sensing signal that includes a digital to analog converter means for digital control of the amplitude of the time-varying signal complementary to the sensing signal;
   summing means for adding the sensing signal and the electrical time-varying signal complementary to the sensing signal to create a summation signal whose time-varying amplitude portion is less than the sensing signal or opposite in polarity to the sensing signal; and
   detection means responsive to the time-varying portion of the summation signal to create a detection signal indicative of an energy field disturbance, such means including a conversion means to translate the detection signal to a digital signal proportionate to the level of the detection signal.

3. An apparatus for sensing a disturbance within a sensing region, comprising:
   an emitting means for emitting a field of energy;
   control means to adjust the amplitude of the emitted field of energy;
   sensing means for receiving energy from the emitted field to produce a corresponding electrical sensing signal;
   signal generation means for producing an electrical signal complementary in nature to the sensing signal;
   summing means for adding the electrical sensing signal and the electrical signal complementary to the sensing signal to create a summation signal whose amplitude is less than the sensing signal or opposite in polarity to the sensing signal; and
   detection means responsive to the summation signal to create a detection signal indicative of an energy field disturbance.

4. An apparatus for sensing a disturbance within a sensing region, comprising:
   an emitting means for emitting a time-varying field of energy that is subject to being disturbed;
   control means to adjust the amplitude of the emitted time-varying field of energy;
   sensing means for receiving energy from the emitted field to produce a corresponding time-varying electrical sensing signal;
   signal generation means for producing a time-varying electrical signal complementary in nature to the sensing signal;
   summing means for adding the electrical sensing signal and the electrical signal complementary to the sensing signal to create a summation signal whose time-varying amplitude portion is less than the sensing signal or opposite in polarity to the sensing signal; and detecting means responsive to the time-varying portion of the summation signal to create a detection signal capable of indicating an energy field disturbance.

5. The apparatuses of claims 1 or 2 including digital logic or a digital processing element employing an algorithm for the control of the digital to analog converter, wherein the logic of digital processing element is responsive to the digital signal representative of the detection signal or an external control signal or both.

6. The apparatuses of claims 2 or 4 wherein the time-varying energy field and time-varying complementary signal are pulsed.

7. The apparatuses of claims 3 or 4 wherein the control means used to adjust the amplitude of the emitted energy field are made responsive to the detection signal or to external control signals or both.

8. The apparatuses of claims 3 or 4 wherein the control means include a digital to analog converter to provide control of the amplitude of the emitted energy field, and an analog to digital converter to convert the detection signal to digital form.

9. The apparatuses of any of claims 1 through 4 wherein signal amplifier means are incorporated to amplify the signal issuing from the sensing means, the amplifier means being placed either at the output of the sensing means or the output of the summing means, or both.

10. The apparatuses of any of claims 1 through 4 wherein signal filtering means are included at the output of the detection means.

11. The apparatus of claim 10 wherein the signal filtering means is implemented in digital logic or in digital processing means employing a filtering algorithm, such logic or processing means taking as its input the digital signal representative of the detection signal.

12. The apparatuses of any of claims 1 through 4 including comparator means for comparing the detection signal against one or more reference signals to provide one or a plurality of digital signals indicative of the level of the detection signal relative to the reference signals.

13. The apparatuses of any of claims 1 through 4 wherein the emitting means comprises one or more solid state devices such as a light emitting diode, and the sensing means comprises one or more solid state devices such as a photodiode.

14. A method for sensing a disturbance within a region comprising:

generating a radiated field of energy that is subject to being disturbed by objects within the region;

sensing of the radiated field of energy to produce a signal related to the received energy from the radiated field;

generating an electrical signal complementary to the signal resulting from the sensing of the radiated field;

generating a detection signal proportional to the sum of the signal related to the received energy from the radiated field and the electrical complementary signal, the sum and detection signal having a null or minimum condition;

adjusting the amplitude of the electrical complementary signal to alter the degree of field disturbance required to achieve a null or minimum condition, the adjustment being performed digitally.

15. The method of claim 14 in which the adjustment of the complementary signal is made responsive to the detection signal or external control signals or both.

16. A method for sensing a disturbance within a region comprising:

generating a radiated field of energy that is disturbed by objects with the region;

sensing of the radiated field of energy to produce a signal related to the received energy from the radiated field;

generating an electrical signal complementary to the signal resulting from the sensing of the radiated field;

generating a detection signal proportional to the sum of the signal related to the received energy from the radiated field and the complementary signal, the detection signal having a null or minimum condition; and adjusting the intensity of the radiated field of energy to alter the degree of field disturbance required to achieve a null or minimum condition.

17. The method of claim 16 in which the adjustment of the radiated energy field is made responsive to the detection signal or external control signals or both.

18. The method of claim 16 wherein the adjustment of the intensity of the radiated field of energy is performed digitally.

19. The methods of claims 14 or 16 in which the energy field and the complementary signal are made to contain a time-varying amplitude component.

20. The methods of claims 14 or 16 wherein the energy field consists of photons generated by a solid state device such as a light emitting diode, and the sensing of said field occurs by the conversion of photon energy to an electrical signal through a photosensitive device such as a photodiode.

* * * * *